United States Patent [19]
Carvalho

[11] Patent Number: 5,255,277
[45] Date of Patent: Oct. 19, 1993

[54] ELECTRONIC PULSE WIDTH CONTROLLER FOR FLASHLAMP PUMPED LASERS

[75] Inventor: Joseph E. Carvalho, Hollister, Calif.

[73] Assignee: Whittaker Ordnance, Inc., Hollister, Calif.

[21] Appl. No.: 767,214

[22] Filed: Sep. 30, 1991

[51] Int. Cl.$^5$ .............................................. H01S 3/00
[52] U.S. Cl. ........................................ 372/38; 372/70; 372/69; 372/25; 315/208; 315/241 P
[58] Field of Search .................... 372/38, 69, 25, 18, 372/70; 315/241 P, 208, 194

[56] References Cited
U.S. PATENT DOCUMENTS

| | | | |
|---|---|---|---|
| 3,626,326 | 12/1971 | Wuerker et al. | 372/38 |
| 3,659,225 | 4/1972 | Furumoto et al. | 372/69 |
| 3,806,829 | 4/1974 | Duston et al. | 372/38 |
| 3,829,791 | 8/1974 | Schwartz | 372/68 |
| 4,074,208 | 2/1978 | Mack et al. | 372/38 |
| 4,264,870 | 4/1981 | Avicola et al. | 372/18 |
| 4,276,497 | 6/1981 | Burbeck et al. | 372/70 |
| 4,398,129 | 8/1983 | Logan | 372/25 |
| 4,489,415 | 12/1984 | Jones, Jr. | 372/38 |
| 4,591,761 | 5/1986 | Gregorich et al. | 372/29 |
| 4,856,012 | 8/1985 | Takenaka | 372/25 |
| 4,910,438 | 3/1990 | Farnsworth | 315/241 P |
| 4,930,901 | 6/1990 | Johnson et al. | 372/25 |

Primary Examiner—Léon Scott, Jr.
Attorney, Agent, or Firm—Henry M. Bissell

[57] ABSTRACT

A flashlamp pumped laser is controlled to emit a series of narrow pulse width laser pulses in quick succession. A control circuit associated with the flashlamp receives firing signals of limited pulse duration and serves to ignite and extinguish the flashlamp in accordance with the leading and trailing edges of a single firing signal pulse. The laser generates a coherent light pulse corresponding to the pumping flashlamp pulse. The flashlamp control circuit includes a main capacitor which stores electric charge sufficient to provide current to the flashlamp for several pulses in succession. The circuit also includes a trigger capacitor which supplies current through a transformer coupled to the flashlamp to initiate current conduction therein. Both circuit paths, the main path through the flashlamp and the auxiliary path from the trigger capacitor, are commonly connected to an Insulated Gate Bipolar Transistor (IGBT) which serves as a switch to turn the flashlamp on and off in response to a firing signal pulse.

23 Claims, 2 Drawing Sheets

ELECTRONIC PULSE WIDTH CONTROLLER FOR FLASHLAMP PUMPED LASERS

BACKGROUND OF THE INVENTION

1. Field of the Invention.

This invention relates to flashlamp pumped lasers and, more particularly, to circuitry and systems for controlling the pulse width of lasers which are pumped by a flashlamp.

2. Description of the Related Art.

The word "laser" is an acronym for the principal feature of laser action: light amplification by stimulated emission of radiation. There are many different kinds of lasers, but all share a crucial element: each contains material capable of amplifying radiation.

The first construction of a laser is said to have been by T. H. Maiman in 1960. Lasers quickly expanded into various fields of application. There are gas lasers and solid state lasers. Some are operative in a continuous mode; others are operated in a pulsed mode which may permit the laser to emit tremendous levels of peak power for extremely short intervals.

The principal reason for utilization of lasers is their property of being able to emit coherent light radiation, which means that an extremely narrow beam can be transmitted for long distances without degradation of the phase relationships and with very limited dispersion. The ability of the laser to direct concentrated energy at precisely located targets and in precisely measured amounts also makes the laser useful in surgical applications, welding, etc. The coherent property of the light radiation has made possible the development of the technology of holography. There are many other uses of lasers, both industrial and scientific.

According to the literature, the first laser was pumped with the bright flash of light from a Xenon flashlamp, and flashlamp pumping remains common today (see the book entitled "SOLID-STATE LASERS" by Jeff Hecht, copyright 1988, Howard Sams & Co. (page 237 et seq).

Known existing laser systems which have the capability of varying laser pulse width are very large and expensive. These systems use very large power supplies to charge storage capacitors at a very rapid rate so that the laser can be fired again within a short time after the previous pulse. In systems of this type, laser pulses are controlled by a device known as a Q-switch. Such devices enable the generation of very short (approximately 30 nanosecond), intense laser pulses by enhancing the storage and dumping of electronic energy in and out of the lasing medium. A Q-switch may, for example, be used with a ruby laser in a dual-pulse mode for holographic measurements. In such a mode, a Q-switch generates two short pulses during a single long flashlamp pulse, thus turning the laser on twice during the millisecond duration of the flashlamp pulse. This kind of operation has limited application and the required control equipment is cumbersome and costly.

Other lasers, such as those used to set off pyrotechnic devices—e.g., explosive bolts and the like—are generally much smaller capacity, single shot units which have no control of pulse width nor any capability of firing laser pulses in rapid succession.

In pyrotechnic systems such as are known, there is either one laser per ordnance device or there must be a substantial waiting time between the firing of successive laser pulses. This interval is on the order of hundreds of milliseconds. In systems where it is desirable to generate laser pulses in rapid succession, the power supplies are necessarily very large and expensive, as noted above. In some laser systems, such as those which are used in a laboratory, it is desirable to be able to control the pulse width with control equipment of much less cost and complexity.

SUMMARY OF THE INVENTION

In brief, arrangements in accordance with the present invention provide pulse width control which has heretofore been unavailable in small, inexpensive laser systems. This enables such laser systems to be able to fire multiple devices in rapid succession. The disclosed arrangements incorporate trigger circuits for flashlamp pulsed lasers which draw the flash energy from a power supply capacitor. The trigger circuit also includes a trigger capacitor for controlling the trigger device. The trigger device can then be turned off as soon as the flash occurs, thereby limiting the width of the laser pulse and leaving some measure of charge on the power supply capacitor for the next pulse.

In one particular embodiment of the invention, a laser/flashlamp trigger circuit includes a main capacitor and a smaller, trigger capacitor, both of which are charged to a predetermined level by an associated power supply. The flashlamp which is positioned adjacent the laser in order to trigger the laser light pulse is connected across the main capacitor through the collector-emitter path of an Insulated Gate Bipolar Transistor (IGBT). A firing signal path is provided through a resistor in series with the transistor gate. The trigger capacitor is also connected to be discharged by the IGBT but through the serially connected primary winding of a transformer, the secondary winding of which is coupled to supply a trigger voltage to the flashlamp.

In this embodiment, a firing pulse signal applied to the gate of the IGBT turns on the transistor, thus developing a high voltage pulse from trigger capacitor current flowing through the transformer which ignites the flashlamp, thereby pumping the laser. During flashlamp ignition, current is provided by the main capacitor and power supply which flows through the flashlamp and IGBT. Termination of the firing pulse, reducing the gate voltage to zero, shuts off the IGBT. This blocks current from the main capacitor through the flashlamp and terminates light from the flashlamp. Since the associated laser is no longer pumped by the flashlamp, it stops lasing.

In a second embodiment of the invention, the main and trigger capacitors are provided as before in circuit with a flashlamp and IGBT. In this embodiment, which incorporates a series trigger design, the secondary of the transformer is connected in series with the flashlamp. Ignition of the flashlamp occurs in the same fashion as before by the application of a firing signal to the gate of the IGBT, which conducts to complete the circuit path for the trigger capacitor current through the transformer primary. This generates a stepped up voltage across the transformer secondary sufficient to ignite the flashlamp, thereby pumping the laser. Termination of the firing signal turns off the IGBT, thereby interrupting both the trigger circuit and flashlamp current paths, thus extinguishing the flashlamp and so terminating the laser pulse. The trigger capacitor quickly recharges and the cycle is complete and ready to complete. The main capacitor recharges more slowly to restore the charge that was removed. However, it can be fired again immediately without waiting to recharge completely, as long as there is sufficient voltage left on the capacitor to drive the flashlamp circuit.

In accordance with one particular aspect of the invention, an associated sensing arrangement may be provided for measuring the actual width of the laser pulse so that it can be adjusted as desired or can be set at a fixed value. In accordance with another aspect, a laser distributor system is utilized to permit a plurality of lasers to be pulsed from a single power supply main capacitor.

DESCRIPTION OF THE DRAWING

A better understanding of the present invention may be gained from a consideration of the following detailed description, taken in conjunction with the accompanying drawing, in which.

DETAILED DESCRIPTION OF THE PREFERRED EMBODIMENTS

Figure 1:
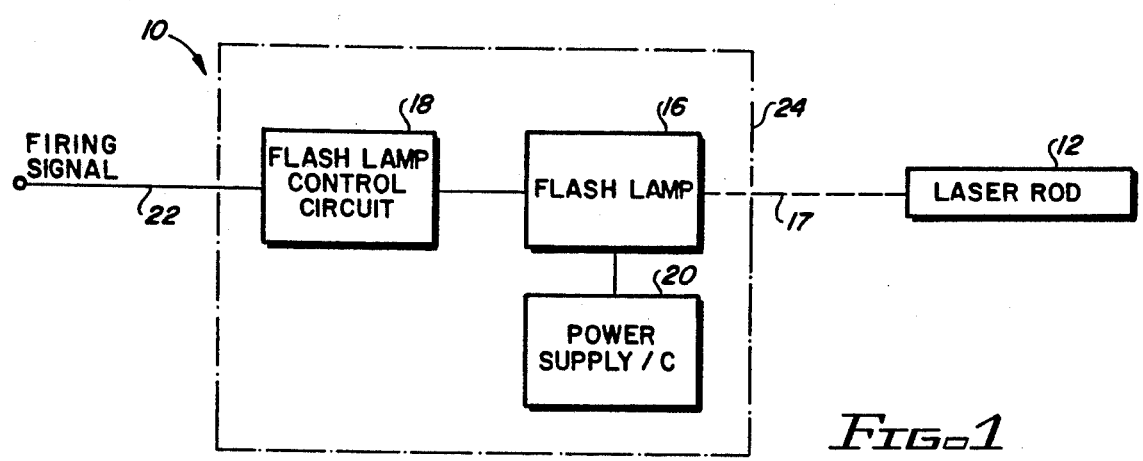
FIG. 1 is a block diagram representing one particular arrangement in accordance with the present invention.

A first particular arrangement of a system 10 in accordance with the present invention is represented in the schematic block diagram of FIG. 1. In this diagram the system 10 is shown as comprising a laser rod 12 in conjunction with a pulse control circuit 24. A flashlamp 16 is indicated by the broken line 17 as interacting with the laser rod 12 to control the pulsing thereof. A flashlamp control circuit 18 and a power supply 20 are shown connected to control operation of the flashlamp 16 in response to firing signals on a line 22 coupled to the input of the flashlamp control circuit 18. As indicated by the "/C" designation, the power supply 20 may include a main capacitor as the source of current for the flashlamp 16.

Figure 2:
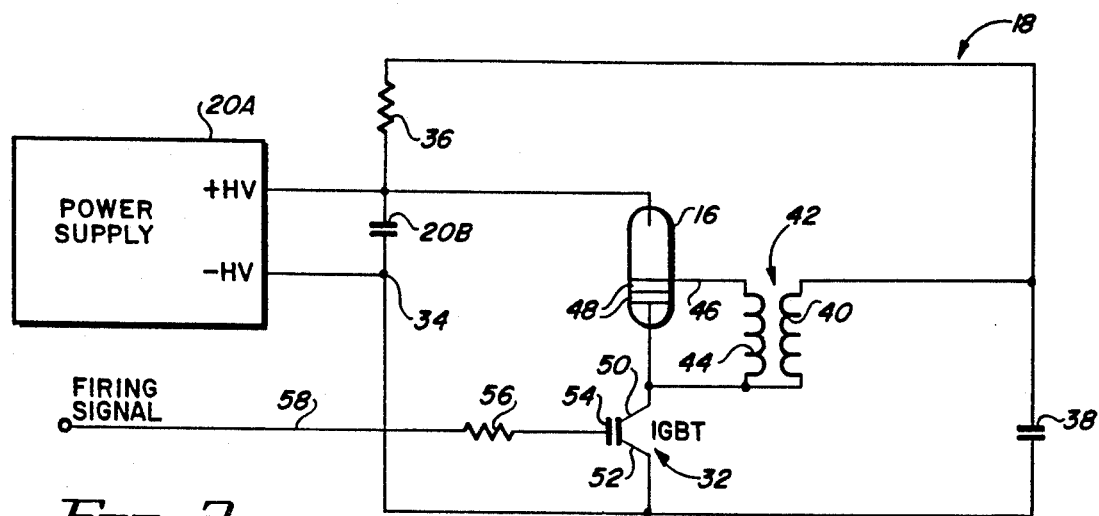
FIG. 2 is a schematic diagram of one particular circuit for a portion of the arrangement of FIG. 1.

The schematic diagram of FIG. 2 represents the circuit details of that portion of the diagram of FIG. 1 which is within the dot-dash line 24 of FIG. 1. FIG. 2 shows a power supply 20A and main capacitor 20B coupled to provide power to the flashlamp 16 and flashlamp control circuit 18. A first current path leads from the positive terminal 30 through the flashlamp 16 in series with an Insulated Gate Bipolar Transistor (IGBT) 32 to a negative power supply terminal 34. A second current path extends from the positive terminal 30 through resistor 36 and trigger capacitor 38 to the negative terminal 34. In parallel across the trigger capacitor 38 is the primary winding 40 of a transformer 42 in series with the IGBT 32. The secondary winding 44 of the transformer 42 is connected to a lead 46 which has three or four turns 48 wound around one end of the flashlamp 16. The IGBT 32 has collector 50 and emitter 52 electrodes connected in the main current path, as shown and described. The gate electrode 54 is connected through a resistor 56 to a firing signal lead 58 provided to receive applied firing signals to activate the flashlamp 16 and thereby the laser rod 12.

In the operation of the circuit of FIG. 2 combined in the arrangement depicted in FIG. 1, static conditions find the main capacitor 20B and the trigger capacitor 38 fully charged from the power supply 20A with all circuit paths open (non-conducting). The appearance of the firing signal on lead 58 triggers the IGBT 32 into conduction. Resulting current flow from the trigger capacitor the primary winding 40 of transformer 42 develops a 38 through the primary winding 40 of transformer 42 develops a triggering pulse from the secondary winding 44 and through the turns 48 to ignite the flashlamp 16. Current through the flashlamp 16 also flows through the IGBT 32. The resulting flash from the flashlamp 16 pumps the laser rod 12, initiating a laser light pulse.

The IGBT 32 is maintained conducting for the duration of the firing signal on the lead 58. When the firing signal terminates, the IGBT 32 ceases conduction, thereby terminating the discharge of current from the trigger capacitor 38 and interrupting current through the flashlamp 16 which then extinguishes. Without continued pumping from the flashlamp 16, the pulse from the laser rod 12 also terminates. Capacitors 20B and 38 begin charging toward their static condition. Since the charge on these capacitors has not been entirely depleted because of the interruption of their discharge paths by the turning off of the IGBT, the entire circuit can be cycled again upon the application of a succeeding firing signal much sooner after the termination of the preceding firing signal than if control of conduction by the IGBT 32 in the manner described were not effected. Thus a series of pulses in rapid succession from the laser rod 12 may be generated through the use of the circuitry shown in FIGS. 1 and 2.

Figure 3:
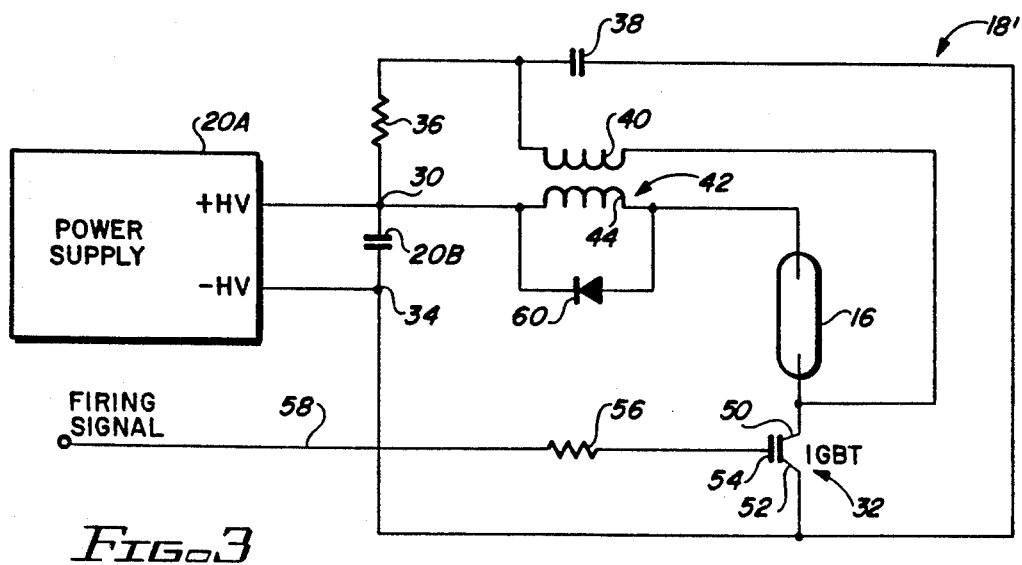
FIG. 3 is a schematic diagram of an alternative circuit arrangement for the same portion of FIG. 1.

FIG. 3 is a schematic diagram of a circuit arrangement 18' which may be utilized in the arrangement of FIG. 1 in place of the circuit 18 shown in FIG. 2. The arrangement 18' of FIG. 3 is much like the circuit of FIG. 2 with the exception that the secondary winding 44 of the transformer 42 is connected in series with the flashlamp 16, rather than providing a parallel coupling to develop ignition of the flashlamp 16. The remaining elements in FIG. 3 are the same as those in FIG. 2 and bear the same reference numerals A diode 60 is connected across the secondary winding 44 to absorb the inductive spike when current through the flashlamp 16 is interrupted by turning off the IGBT 32.

As with the circuit of FIG. 2, application of a firing signal on the input line 58 in FIG. 3 turns on the IGBT 32, thereby initiating conduction through the primary winding 40 from the trigger capacitor 38. This develops the voltage out of the secondary winding 44 which has sufficient amplitude to initiate ignition in the flashlamp 16 which in turn pumps the laser rod 12 to initiate the coherent light pulse therefrom. Termination of the firing signal in FIG. 3 turns off the IGBT 32, thereby extinguishing the flashlamp 16 and terminating current flow out of the trigger capacitor 38. Both capacitors then begin to charge up to their static levels. The pulse from the laser rod 12 terminates. Subsequent firing signals on line 58 re-activate the flashlamp 16 and laser rod 12 in correspondence therewith.

Figure 4:
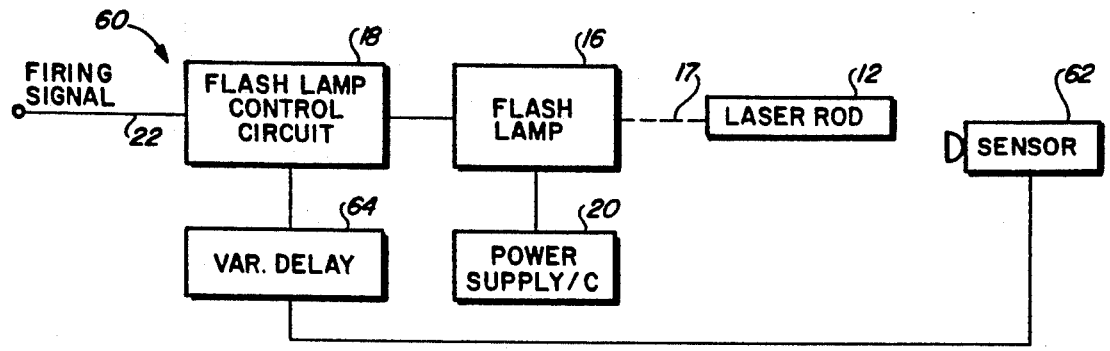
FIG. 4 is a block diagram like that of FIG. 1, representing an additional feature in accordance with the present invention.

FIG. 4 shows a system 60 which is essentially like the system 10 of FIG. 1 with the addition of a sensor 62 which is positioned to monitor pulses from the laser rod 12 and provide a corresponding input to the flashlamp control circuit 18 or 18' to permit adjustment of the laser pulse width to a predetermined level, as desired. A signal from the sensor 60 corresponding to initiation of the laser pulse is applied through a variable delay network 64 to effect termination of conduction in the flashlamp 16 after a predetermined interval, thereby precisely controlling the pulse width of the laser pulses.

Figure 5:
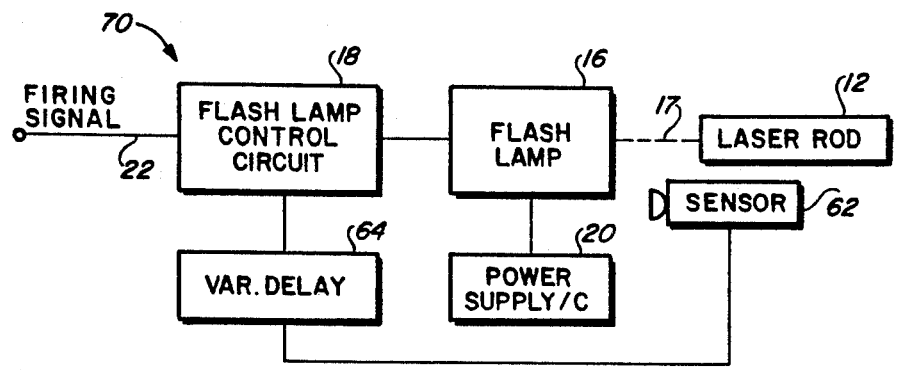
FIG. 5 is a block diagram like that of FIG. 1, showing an alternative arrangement for the feature which is added in FIG. 4.

FIG. 5 is a variation of the system depicted in FIG. 4 and shows a system 70 having the sensor 62 situated to respond to light from the flashlamp 16, rather than directly to light from the laser rod 12 as in FIG. 4. In all other respects, the operation of the system 70 of FIG. 5 is the same as that described for the system 60 of FIG. 4.

Figure 6:
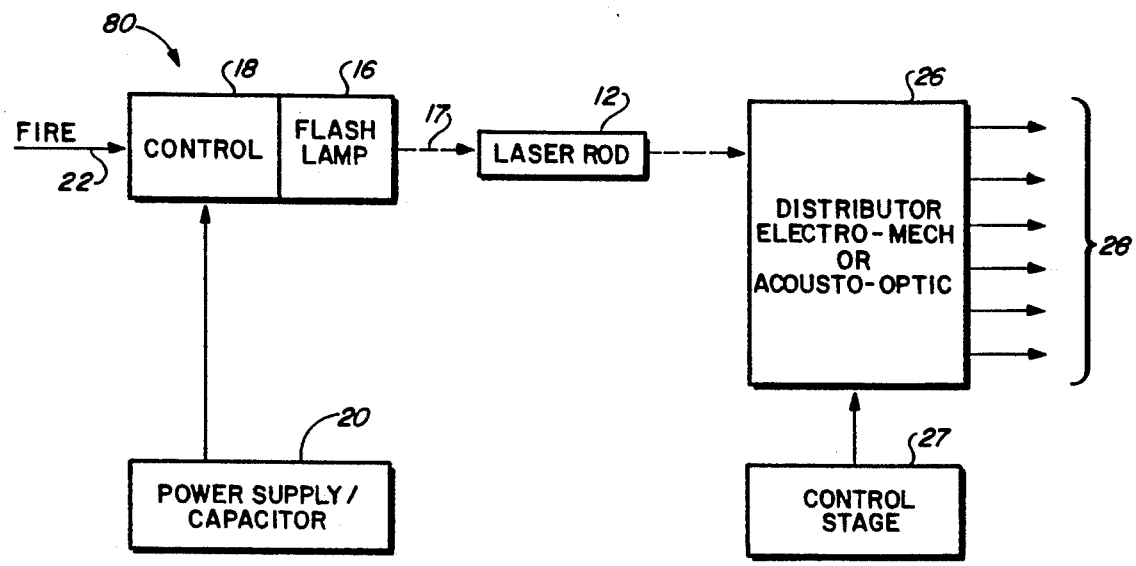
FIG. 6 is a schematic block diagram illustrating another aspect in accordance with the present invention.

FIG. 6 depicts a combination system 80 comprising a laser control circuit, like the arrangement of FIG. 1, coupled to a laser pulse distributor 26. A stage 27 is connected to control the distributor 26 to direct a received laser pulse to a selected output path. Devices suitable for use as the distributor 26 are known in the art and may, for example, be either electro-mechanical or acoustic-optical in operation. As shown in FIG. 6, the laser control circuit includes a firing signal input lead 22, a control circuit 18, a flashlamp 16, a power supply 20 and a laser rod 12. The distributor 26 is shown having a plurality of fiber optic output paths 28, each of which is directed to a corresponding ordnance device (not shown).

In the operation of the circuit of FIG. 6, the flashlamp 16 is ignited and extinguished quickly in rapid succession to develop a plurality of very short, closely spaced pulses from the laser rod 12. Concurrently, the distributor 26 is controlled by the control stage 27 to sequence the transfer of the laser pulses to selected ones of the optical fibers 28, thereby activating the associated ordnance devices in succession.

Although there have been described hereinabove various specific arrangements of an electronic pulse width controller for flashlamp pumped lasers in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A flashlamp pumped laser system comprising:
   a laser;
   a flashlamp coupled to said laser so as to pump said laser when the flashlamp is energized, thereby initiating a pulse of coherent light energy from said laser;
   a storage capacitor power supply for providing current to power said flashlamp during activation thereof; and
   circuit means for selectively activating said flashlamp to pump said laser in response to an applied firing signal, said circuit means including means for applying an inductive transient signal to said flashlamp to energize the flashlamp and initiate current conduction therein and means for selectively terminating the activation of said flashlamp and thereby terminating said pulse of light energy form said laser upon the termination of said applied firing signal.

2. The system of claim 1 wherein said last-mentioned means comprise a conductor wound about a portion of the flashlamp and means connecting said conductor to a transformer secondary winding coupled to said circuit means.

3. The system of claim 1 wherein said last-mentioned means comprise a transformer secondary winding connected in series circuit with said flashlamp.

4. The system of claim 5 further including means coupling said transformer secondary winding to said circuit means.

5. The system of claim 1 wherein said terminating means comprise means for interrupting the flow of current through said flashlamp upon the termination of said firing signal.

6. The system of claim 5 wherein both said activating means and said interrupting means comprise an insulated gate bipolar transistor (IGBT) connected in series circuit with said flashlamp.

7. A flashlamp pumped laser system comprising:
   a laser;
   a flashlamp coupled to said laser so as to pump said laser when the flashlamp is energized, thereby initiating a pulse of coherent light energy from said laser;
   a storage capacitor power supply for providing current to power said flashlamp during activation thereof;
   circuit means for selectively activating said flashlamp to pump said laser in response to an applied firing signal, said circuit means including means for selectively terminating the activation of said flashlamp and thereby terminating said pulse of light energy from said laser upon the termination of said applied firing signal;
   said circuit means further including an electronic switching device connected in series circuit with said flashlamp and responsive to said applied firing signal to initiate current flow through a transformer which is connected in series circuit with said electronic switching device, the initiation of current through said transformer serving to develop an inductive transient signal which is coupled to said flashlamp.

8. The system of claim 7 wherein said electronic switching device comprises an Insulated Gate Bipolar Transistor (IGBT).

9. A flashlamp pumped laser system comprising:
   a laser;
   a flashlamp coupled to said laser so as to pump said laser when the flashlamp is energized, thereby initiating a pulse of coherent light energy from said laser;
   a storage capacitor power supply for providing current to power said flashlamp during activation thereof;
   circuit means for selectively activating said flashlamp to pump said laser in response to an applied firing signal, said circuit means including means for selectively terminating the activation of said flashlamp and thereby terminating said pulse of light energy from said laser upon the termination of said applied firing signal;
   said circuit means further including an Insulated Gate Bipolar Transistor (IGBT) in series circuit with said flashlamp for controlling the current path to said flashlamp.

10. The system of claim 11 wherein the power supply comprises power source means and a main capacitor coupled to supply current to said flashlamp through said IGBT when said IGBT is triggered to the conducting condition by said firing signal.

11. The system of claim 10 further including a trigger capacitor and a transformer connected in series circuit with said IGBT.

12. The system of claim 11 wherein said transformer has a primary winding connected in series circuit with said trigger capacitor and said IGBT for initiating ignition of said flashlamp upon said IGBT being triggered into conduction by said firing signal.

13. The system of claim 12 wherein said transformer further includes a secondary winding coupled to apply an inductive transient signal to said flashlamp to initiate ignition therein.

14. The system of claim 13 wherein said secondary winding is connected in series circuit with said flashlamp.

15. The system of claim 14 further including a reversely polarized diode connected across said secondary winding for absorbing reverse polarity inductive transient signals therefrom.

16. The system of claim 14 wherein said secondary winding is coupled to a conducting lead which is wound around a portion of said flashlamp to develop inductive coupling thereto.

17. The system of claim 12 wherein the termination of conduction in said IGBT upon the termination of said firing signal is effective to terminate further discharge of both said main capacitor and said trigger capacitor and to interrupt current flow through said flashlamp, thereby extinguishing the flashlamp and the associated laser.

18. The system of claim 12 further including means for charging said trigger capacitor to a quiescent charge storage condition upon the termination of current flow through said IGBT in preparation for the ignition of said IGBT by the next-in-time firing signal.

19. A flashlamp pumped laser system comprising:
a laser;
a flashlamp coupled to said laser so as to pump said laser when the flashlamp is energized, thereby initiating a pulse of coherent light energy from said laser;
a storage capacitor power supply for providing current to power said flashlamp during activation thereof;
circuit means for selectively activating said flashlamp to pump said laser in response to an applied firing signal, said circuit means including means for selectively terminating the activation of said flashlamp and thereby terminating said pulse of light energy from said laser upon the termination of said applied firing signal;
sensing means responsive to light radiation generated by said system; and
means coupled to the sensing means for controlling the termination of current flow in said flashlamp.

20. The system of claim 19 wherein said sensing means is positioned to respond to coherent light energy from said laser.

21. The system of claim 19 wherein said sensing means is positioned to respond to light radiation from said flashlamp.

22. The system of claim 19 further including a variable delay circuit coupled between said sensing means and said circuit means to initiate the interruption of flow of current through said flashlamp at a predetermined time interval following the light activation of said sensing means.

23. A flashlamp pumped laser system comprising:
a laser;
a flashlamp coupled to said laser so as to pump said laser when the flashlamp is energized, thereby initiating a pulse of coherent light energy from said laser;
a storage capacitor power supply for providing current to power said flashlamp during activation thereof;
circuit means for selectively activating said flashlamp to pump said laser in response to an applied firing signal, said circuit means including means for selectively terminating the activation of said flashlamp and thereby terminating said pulse of light energy from said laser upon the termination of said applied firing signal;
distribution means positioned to receive a succession of pulses from said laser;
a plurality of fiber optic output paths extending from said distributing means; and
control means coupled to the distributor means for directing said pulses to predetermined ones of said output paths.

* * * * *